United States Patent [19]

Ueda et al.

[11] 3,939,859
[45] Feb. 24, 1976

[54] UNLOADER VALVE WITH FLOW DIVIDER

[75] Inventors: Atsumi Ueda, Toyota; Uichiro Kobashi, Okazaki, both of Japan

[73] Assignee: Aisin Seiki Kabushiki Kaisha, Kariya, Japan

[22] Filed: Jan. 22, 1974

[21] Appl. No.: 435,601

[30] Foreign Application Priority Data
Feb. 13, 1973   Japan................................ 48-18011

[52] U.S. Cl................................. 137/118; 137/117
[51] Int. Cl.².......................................... G05D 11/00
[58] Field of Search ........ 137/101, 115, 116, 116.3, 137/116.5, 117, 118; 91/412

[56] References Cited
UNITED STATES PATENTS

| | | | |
|---|---|---|---|
| 2,799,996 | 7/1957 | Van Meter........................... | 137/118 |
| 2,818,711 | 1/1958 | Lincoln et al........................ | 137/118 |
| 2,859,762 | 11/1958 | Banker................................ | 137/101 |
| 3,011,506 | 12/1961 | Schwartz et al. .................... | 137/115 |
| 3,575,192 | 4/1971 | MacDuff............................. | 137/118 |
| 3,692,039 | 9/1972 | Ewald et al......................... | 137/118 |

Primary Examiner—Irwin C. Cohen
Assistant Examiner—George L. Walton
Attorney, Agent, or Firm—Pierce, Scheffler & Parker

[57] ABSTRACT

An unloader valve with flow divider having a fluid pressure source, a first fluid pressure circuit with an accumulator, and a second fluid pressure circuit, comprising a main body having a large diameter cylinder and a small diameter cylinder which are provided as coaxial circles, a spool valve slidably inserted into the large diameter cylinder, a piston slidably inserted into the small diameter cylinder and the spool valve, respectively, a first chamber provided in the large diameter cylinder and fluidly connected with the fluid pressure source, orifice means provided in the spool valve and always fluidly connected with the first chamber, a second chamber provided in the large diameter cylinder and fluidly connected with the first chamber via the orifice means, spring means disposed within the second chamber for biasing the spool valve to the first chamber side, first valve means controlling the communication between the fluid pressure source and the first fluid pressure circuit via the orifice means, and second valve means controlling the communication between the first chamber and the fluid pressure source.

2 Claims, 3 Drawing Figures

U.S. Patent  Feb. 24, 1976  3,939,859
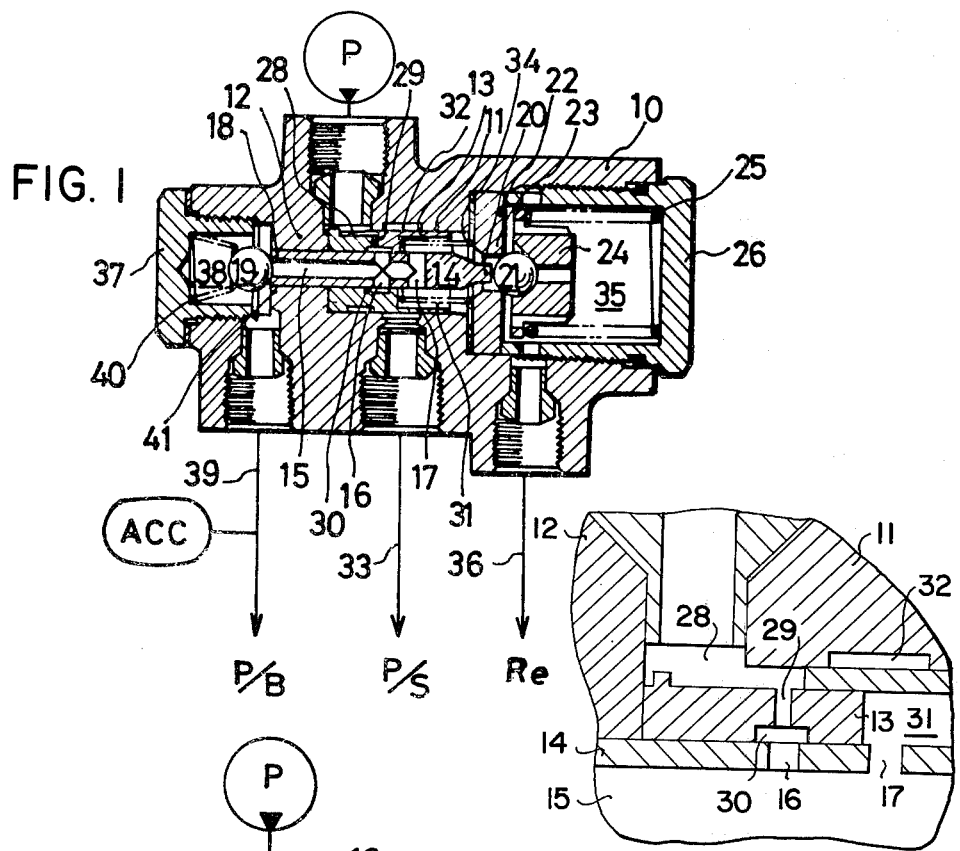
FIG. 1
FIG. 1a
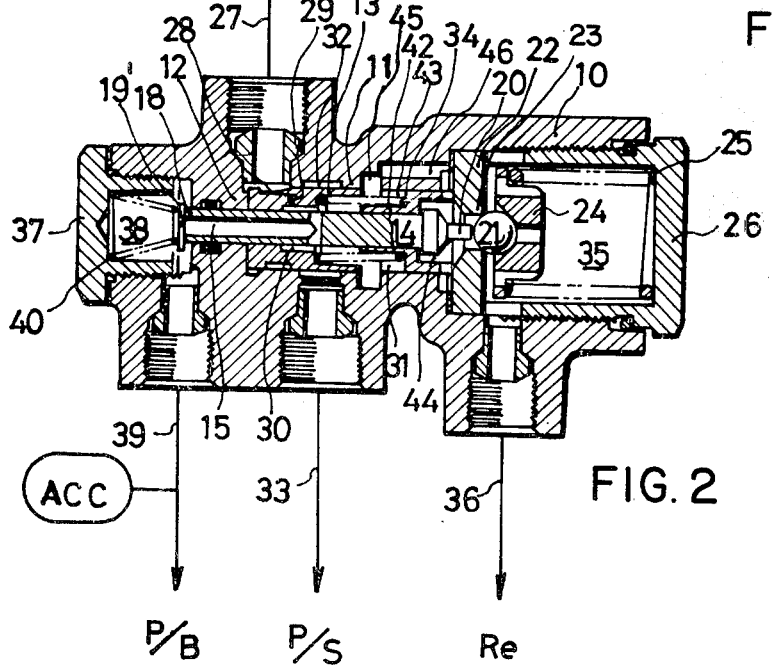
FIG. 2

UNLOADER VALVE WITH FLOW DIVIDER

BACKGROUND OF THE INVENTION

1. Field of the Invention

This invention relates generally to an unloader valve with flow divider and more particularly to an unloader valve with flow divider for dividing the hydraulic fluid into two hydraulic circuits and for regulating the fluid pressure.

2. Description of the Prior Art

In general, it is well-knnown that a flow divider is provided for dividing a certain discharging amount of hydraulic fluid into two hydraulic circuits in certain amounts and it is also well-known that one of the two hydraulic circuits is arranged for a closed circuit and therefore a valve system specially with an unloader valve is provided.

SUMMARY OF THE INVENTION

It is therefore an object of the invention to provide an improved unloader valve with flow divider for dividing the hydraulic fluid into two hydraulic circuits and for regulating the fluid pressure.

Another object of the present invention to provide a unique and highly simplified unloader valve with flow divider.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings, wherein like reference numerals designate like or corresponding parts throughout the views and in which:

FIG. 1 is a schematic view of an unloader valve with flow divider constructed according to the invention;

FIG. 1a shows an enlarged view of a portion of FIG. 1;

FIG. 2 is a similar view to FIG. 1, however, showing another embodiment.

DESCRIPTION OF THE PREFERRED EMBODIMENT

Referring now to FIGS. 1 and 1a of the accompanying drawing, the first embodiment of the invention will be described hereinbelow in detail.

The numeral 10 represents a main body having a large diameter cylinder 11 and a small diameter cylinder 12. A spool valve 13 is slidably inserted into the large diameter cylinder 11 and a piston 14 is slidably provided within the spool valve 13 and the small diameter cylinder 12, respectively. An axial passage 15 is formed within the piston 14, and radial holes 16, 17 which intersect the axial passage 15 are provided therein as best shown in FIG. 1a. A valve seat 18 is formed on the left end portion of the passage 15 in the piston 14 and cooperates with a ball valve 19. The right end portion 20 of the piston 14 contacts a ball 21 which cooperates with a valve seat 23 of a valve seat member 22. The sealing diameter of the valve seat 23 and the ball 21 is smaller than the cross-sectional diameter of the piston 14. Therefore the ball 21 contacts a spring biasing retainer 24 at the back portion thereof and the spring retainer 24 receives one end of a compression spring 25. The other end of the compression spring 25 contacts a plug 26 screwed into the main body 10.

A pump P is fluidly connected with an inlet chamber 28 through a conduit 27 and the chamber 28 is fluidly connected with an outlet chamber 31 through an orifice 29 provided in the spool valve 13, an annular groove 30, and the holes 16, 17 in the piston 14. (see FIG. 1a) An annular groove 32 is provided within the large diameter cylinder 11 and is fluidly connected with a conduit 33 to a power circuit steering P/S. The communication between the annular groove 32 and the inlet chamber 28 is interrupted by the spool valve 13 as shown in FIG. 1. However by the rightward movement of the spool valve 13 the annular groove 32 and the inlet chamber 28 are communicated. A compression spring 34 is disposed between the spool valve 13 and the valve seat member 22 and urges the spool valve 13 to the left as shown in FIG. 1.

A chamber 35 within the plug 26 is fluidly connected with a reservoir Re through a conduit 36 and a chamber 38 within a plug 37 is fluidly connected with an accumulator ACC and a power brake circuit P/B or other fluid actuating mechanism through a conduit 39. The ball 19 is biased by a compression spring 40 so as to seat on the valve seat 18. A valve seat 41 is formed on the left end portion of the small diameter cylinder 12 and cooperates with ball valve 19 when the circuit of the accumulator side becomes unloaded.

The operation of the unloader valve with flow divider so far shown and described is as follows:

When actuated the power steering circuit P/S restricts the hydraulic fluid from the pump P by a valve, not shown, so that the power steering P/S generates fluid pressure for steering the running wheels, not shown, by this fluid pressure. Accordingly, fluid pressure is not generated within the power steering circuit when the power steering P/S is not actuated.

The hydraulic fluid from the pump P is transmitted into the inlet chamber 28 through the conduit 27 and then this hydraulic fluid is transmitted to the annular groove 30 through the orifice 29 and thereafter to the outlet chamber 31 through the holes 16, 15 and 17. Therefore, pressure of the outlet chamber 31 becomes lower than that of the inlet chamber 28. By the differential pressure between the chambers 28 and 31, the spool valve 13 is moved in the rightward direction, so that the inlet chamber 28 and the annular groove 32 are fluidly connected. Therefore, the hydraulic fluid applied to the power steering P/S through the conduit 33.

In short, a part of the discharged hydraulic fluid from the pump P is supplied through the orifice 29 and the other part is supplied to the power steering P/S. The hydraulic fluid via the orifice 29 is fully transmitted into the outlet chamber 31 and thereafter releases the ball 19 from the valve seat 18 so that the fluid pressure in the chamber 38 increases and accumulates within the accumulator ACC and is transmitted into the power brake circuit P/B.

After the above-mentioned accumulation of pressure, the pressure within the chamber 38 is applied to the chamber 31 via passage 15, holes 16 and 17 and this pressure releases the ball 21 from the seat 23. In consequence, the outlet chamber 31 is fluidly connected to the chamber 35 and to the reservoir Re via the conduit 36. Therefore, the outlet chamber 31 attains atmospheric pressure. The hydraulic fluid within the chamber 38 is applied to the cross-sectional area of the piston 14 so that the piston 14 is moved in the rightward direction and the ball 19 is seated on the valve seat 18 and the ball 21 is fully opened by the right end portion 20 of the piston 14. At this time, the pressure within the chamber 31 increases and the ball 21 is released from the seat 23 by the fluid pressure in the chamber 31. When the fluid pressure within the chamber 31 is decreased, the ball 21 is moved into the opening direction thereof by the piston 14 by a snap-action.

After the outlet chamber 31 is fluidly connected to the reservoir Re, the fluid pressure within the inlet chamber 28 compared to the fluid pressure of the outlet chamber 31 becomes high because of the restriction by the orifice 29.

When the outlet chamber 31 is fluidly connected with the reservoir Re in the above-mentioned inactive state of the power steering P/S, the pump P becomes almost un-loaded. When the fluid pressure in the accumulator ACC is, thereafter, decreased to a predetermined pressure, the piston 14 is moved into the leftward direction or into the position shown in FIG. 2 and the above-mentioned accumulation is repeated. As mentioned above, the hydraulic fluid to the power steering circuit is always maintained and the accumulation of pressure in the accumulator ACC is attained.

Next, the operation of the power steering P/S in the actuating state thereof is hereinafter described;

By starting of the pump P, the spool valve 13 is firstly moved into the rightward direction, and the inlet chamber 28 and the outlet chamber 31 are fluidly connected through the orifice 29, the annular groove 30, the holes 16 and 17. In this state, even when the power steering P/S is actuated, the difference of the pressure between the inlet chamber 28 and the outlet chamber 31 through the orifice 29 is generated to the same degree as in the inactive state of the power steering P/S. Accordingly, the pressure is accumulated in the accumulator ACC and the pressure for actuating the power brake P/B is obtained.

In the event the ball 21 is released from the seat 23 during the actuating state of the power steering P/S, the fluid pressure in the outlet chamber 31 becomes the same as the fluid pressure in the reservoir Re or almost atmospheric and then the difference of the pressure between the inlet chamber 28 and the outlet chamber 31 becomes larger than it was. As a result, the quantity of the hydraulic fluid passing through the orifice 29 is increased and the quantity of the hydraulic fluid to the power steering P/S is decreased. In consequence, the power steering P/S which is in the actuating state is shocked. However, this shock to the power steering P/S doesn't create any substantial interference, if the quantity of the hydraulic fluid accumulated in the accumulator ACC is small. In the actuating state of the power steering P/S, the required fluid pressure to the accumulator ACC and the circuit of power brake P/B is supplied.

The valve for the flow divider, namely, the spool valve 13 and the piston 14 disposed between the cylinders 11 and 12 provides a simple construction of the unloader valve with flow divider.

Referring now to FIG. 2 of the accompanying drawing, the second embodiment of the invention will be described hereinbelow in detail, however, in this embodiment the construction and the operation of the unloader valve with flow divider are substantially the same as in FIG. 1 so that the description thereabout will be omitted and just the different construction and the operation thereof will be described.

The outlet chamber 31 is divided into two chambers 43 and 44 by an annular member 42 and the chamber 43 is fluidly connected with the chamber 44 via an annular groove 45 serving as a variable orifice according to the rightward movement of the spool valve 13, and via a passage 46. The piston 14 is slidably inserted into the center portion of the annular member 42. The spring 34 is interposed between the spool valve 13 and the annular member 42. So the inlet chamber 28 and the outlet chamber 44 are fluidly connected through the orifice 29, the chamber 43, the annular groove 45 and the passage 46.

By starting the pump P in FIG. 2, the spool valve 13 is moved in the righward direction and then the hydraulic fluid is supplied to the power steering P/S. At the same time, the hydraulic fluid is accumulated in the accumulator ACC via the check valve 19'. When the ball 21 is released from the seat 23 by the rightward movement of the spool valve 13, the fluid pressure of the outlet chamber 44 is decreased, but the fluid pressure of the chamber 43 is not decreased immediately, for the spool valve 13 is shifted in the rightward direction and the annular groove 45 is reduced in size by the spool valve 13 and the large diameter cylinder 11. Accordingly, even if the ball 21 is released from the seat 23, the quantity of hydraulic fluid passing through the orifice 29 is not increased immediately as in the first embodiment. Therefore, no shock is applied to the power steering P/S. That is to say, since the passage 46 is provided between the outlet chamber 44 and the chamber 43, the change in the quantity of the hydraulic fluid is not generated by the orifice 29 as much as by the change in the quantity of the hydraulic fluid released by the relief operation of the passage 46.

Obviously, many modifications and variations of the present invention are possible in light of the above teachings. It is to be understood therefore, that within the scope of the appended claims, the present invention may be practiced otherwise than as specifically described herein.

What is claimed as new and desired to be secured by letters patent of the United States is:

1. An unloader valve with flow divider having a fluid pressure source with a pump and a reservoir for providing a substantially constant hydraulic fluid pressure, a first fluid pressure circuit with an accumulator, and a second fluid pressure circuit, comprising:
   a main body having a large diameter cylinder and a small diameter cylinder coaxial therewith,
   an annular spool valve slidably inserted into said large diameter cylinder and having an inner bore;
   a piston slidably inserted into said small diameter cylinder and in the bore of said spool valve, respectively;
   a first chamber provided in said large diameter cylinder and defined by said spool valve and said large diameter cylinder and a passage fluidly connecting said first chamber with said fluid pressure source;
   a second chamber provided in said large diameter cylinder and defined by said spool valve, said piston and said large diameter cylinder and a passage fluidly connecting said second chamber with said first chamber, an annular member disposed within said second chamber for dividing said second chamber into third and fourth chambers, the passage of hydraulic fluid within said third and fourth chambers being controlled according to the movement of said spool valve, orifice means within the fluid passage between said first chamber and said second chamber;

spring means disposed within said second chamber and biasing said spool valve into said first chamber;

first valve means controlling the communication between said fluid pressure source and said first fluid pressure circuit via said orifice means, said spool valve controlling the communication between said first chamber and said second fluid pressure circuit; and second valve means controlling the communication between said second chamber and said reservoir of said fluid pressure source, said second valve means being operated by actuation of said piston according to the pressure in said accumulator and said second chamber when the pressure within said second chamber reaches a preset value and being closed by actuation of said piston when the pressure in said accumulator falls below a preset value.

2. An unloader valve with flow divider as claimed in claim 1, wherein an annular groove is provided on said large diameter cylinder for fluidly connecting said third and fourth chambers, the effective size of said groove being reduced according to the movement of said spool valve.

* * * * *